(12) United States Patent
 Abdelmoneum

(10) Patent No.: US 11,392,678 B2
(45) Date of Patent: Jul. 19, 2022

(54) REMOTE FINGERPRINTING SENSOR

(71) Applicant: Mahmoud Mohamed Abdelmoneum, Portland, OR (US)

(72) Inventor: Mahmoud Mohamed Abdelmoneum, Portland, OR (US)

( * ) Notice: Subject to any disclaimer, the term of this patent is extended or adjusted under 35 U.S.C. 154(b) by 0 days.

(21) Appl. No.: 16/043,079

(22) Filed: Jul. 23, 2018

(65) Prior Publication Data

US 2018/0349588 A1    Dec. 6, 2018

Related U.S. Application Data

(63) Continuation-in-part of application No. PCT/US2017/014638, filed on Jan. 23, 2017.
(Continued)

(51) Int. Cl.
*G06F 21/32* (2013.01)
*G06V 40/13* (2022.01)
(Continued)

(52) U.S. Cl.
CPC .......... *G06F 21/32* (2013.01); *G06F 3/03547* (2013.01); *G06F 3/0488* (2013.01);
(Continued)

(58) Field of Classification Search
CPC ........ G06F 21/32; G06F 21/316; G06F 21/36; G06F 21/6209; G06F 2203/0338; G06F 3/0488; G06F 3/04883; G06F 3/017; G06F 21/31; G06F 2203/04104; G06F 2221/2111; G06F 3/041; G06F 3/0412; G06F 21/45; G06F 3/03547; G06F 3/0416; G06F 3/0481; G06F 3/04817;
G06F 1/1626; G06F 1/1684; G06K 9/0002; G06K 9/00006; G06K 9/00013; G06K 9/00026; G06K 9/00067; G06K 9/00087; G06K 9/00597; G06K 9/00885; G06K 9/00912; G06K 9/036; G06K 9/68; G06K 9/00073; G06K 9/001; G06K 9/00892; G06K 9/00093; G06K 9/00033; G06K 9/0008; G06K 9/00107; G06K 9/00926; G06K 2009/0006; G06K 2009/00953; G06K 9/00114; H04L 63/0861; H04L 9/3231; H04L 63/0853; H04L 63/08; H04L 63/083; H04L 63/06; H04L 63/0807; H04L 63/0815; H04L 63/102; H04L 2463/082; H04L 63/0428; H04L 63/104; H04L 63/061; H04L 63/0838; H04L 63/0876; H04L 63/10; H04L 63/105; H04L 9/06; H04L 9/0866; H04L 2209/805; H04W 12/68;
(Continued)

(56) References Cited

U.S. PATENT DOCUMENTS

2006/0245625 A1\* 11/2006 Tichelaar ........... H04N 21/4394
 382/124
2008/0042983 A1\* 2/2008 Kim .................... G06F 3/03547
 345/173
(Continued)

*Primary Examiner* — Golam Sorowar
(74) *Attorney, Agent, or Firm* — Hojka Qadeer, LLC

(57) ABSTRACT

A fingerprint sensor system and method is provided for enhancing biometric security. Fingerprints may be recorded according to a particular sequence and orientation. Fingerprint sequences may then be used to control the operation of devices, such as restricting content, or encrypting communications.

11 Claims, 9 Drawing Sheets

Related U.S. Application Data

(60) Provisional application No. 62/286,244, filed on Jan. 22, 2016.

(51) Int. Cl.
  *G06F 3/0354*  (2013.01)
  *G06F 3/0488*  (2022.01)

(52) U.S. Cl.
  CPC .... *G06V 40/13* (2022.01); *G05B 2219/24162* (2013.01); *G06F 2203/0336* (2013.01); *G06F 2221/2107* (2013.01)

(58) Field of Classification Search
  CPC . H04W 12/065; H04W 12/06; H04W 12/068; H04W 88/02; H04W 12/069; H04W 4/80; H04W 12/63; H04W 4/029; H04W 8/16; H04W 12/082; H04W 12/40; H04W 12/47; H04W 4/027
  See application file for complete search history.

(56) References Cited

U.S. PATENT DOCUMENTS

| | | | |
|---|---|---|---|
| 2010/0158327 A1* | 6/2010 | Kangas | G06K 9/00006 382/124 |
| 2012/0174214 A1* | 7/2012 | Huang | G06F 21/32 726/19 |
| 2013/0173925 A1 | 7/2013 | Yen et al. | |
| 2013/0234825 A1 | 9/2013 | Malhotra et al. | |
| 2014/0002388 A1 | 1/2014 | Han et al. | |
| 2014/0101737 A1* | 4/2014 | Rhee | H04L 63/0861 726/6 |
| 2015/0332273 A1* | 11/2015 | Bruno | G06Q 20/40145 705/44 |
| 2016/0026850 A1* | 1/2016 | Mrowiec | G06F 3/041 345/173 |
| 2016/0063230 A1* | 3/2016 | Alten | G06F 21/32 |
| 2016/0078274 A1* | 3/2016 | Tuneld | G06K 9/0002 382/124 |
| 2016/0217310 A1* | 7/2016 | Shah | G06F 21/32 |

\* cited by examiner

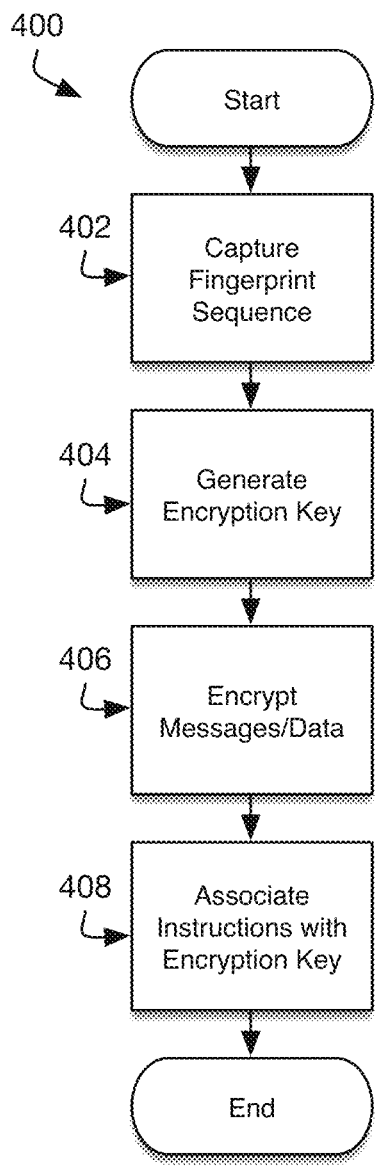
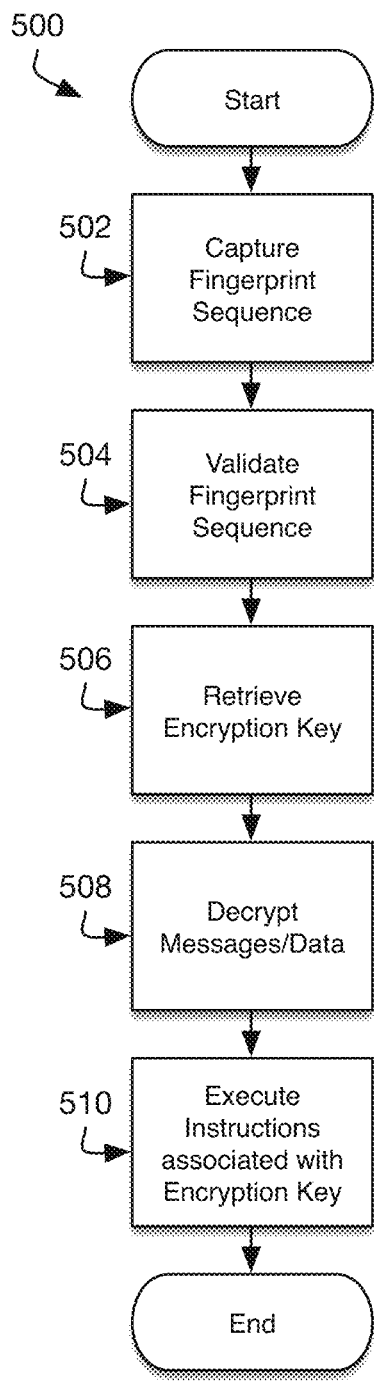

REMOTE FINGERPRINTING SENSOR

CROSS-REFERENCE TO RELATED APPLICATIONS

This application is a continuation-in-part of PCT Patent Application No. PCT/US2017/014638, filed Jan. 23, 2017, which claims the benefit of, and priority to, U.S. Provisional Patent Application Ser. No. 62/286,244, filed Jan. 22, 2016, the entire disclosures of which are incorporated herein by reference.

BACKGROUND

Field of the Invention

The present disclosure relates to devices and methods for touch/proximity sensors that provide authentication and identification of users.

Description of the Related Art

Touch/proximity sensors that provide authentication and identification of users, such as parents and administrators, are known. Using such an authentication and identification approach, privileges may be established to control access to games, shows, and movies according to rating or to content according to a specified time interval. Such methods may also be used to control access to specific web content to limit which players the user may interact with during online gaming or the execution of online financial transactions, and to also set limits for such transactions.

SUMMARY

A system for enhancing fingerprint security is disclosed herein. The system may comprise a set of one or more fingerprint sensors and a processor that may be configured to capture a sequence of fingerprints, wherein the processor may determine an orientation for each fingerprint, determine a sequence number for each fingerprint, compare the sequence of fingerprints based on orientation and sequence number with a fingerprint sequence record, and if a valid comparison is detected perform an instruction associated with said fingerprint sequence record.

BRIEF DESCRIPTION OF THE DRAWINGS

A more detailed description of the invention is provided herein below with reference to the accompanying drawings, in which:

FIG. 4 is an example of a method for creating a sequence of fingerprints.

FIG. 5 is an example of a method for responding to a sequence of fingerprints.

DETAILED DESCRIPTION

A system for enhancing fingerprint security is disclosed herein. The system may comprise a set of one or more fingerprint sensors and a processor that may be configured to capture a sequence of fingerprints, wherein the processor may determine an orientation for each fingerprint, determine a sequence number for each fingerprint, compare the sequence of fingerprints based on orientation and sequence number with a fingerprint sequence record, and if a valid comparison is detected perform an instruction associated with said fingerprint sequence record.

In certain circumstances, a person may be able to create a mold or capture of a user fingerprint. This mold or capture may then be used to fool a fingerprint sensor into recognizing a valid user fingerprint. As described herein, a second level of protection to guard against such fingerprint spoofing may be employed. As an example, the second level of protection may include the use of a sequence of different fingerprints, a sequence of fingerprint orientation patterns, or a sequence involving different fingerprints and orientation patterns thereof.

Figure 1:
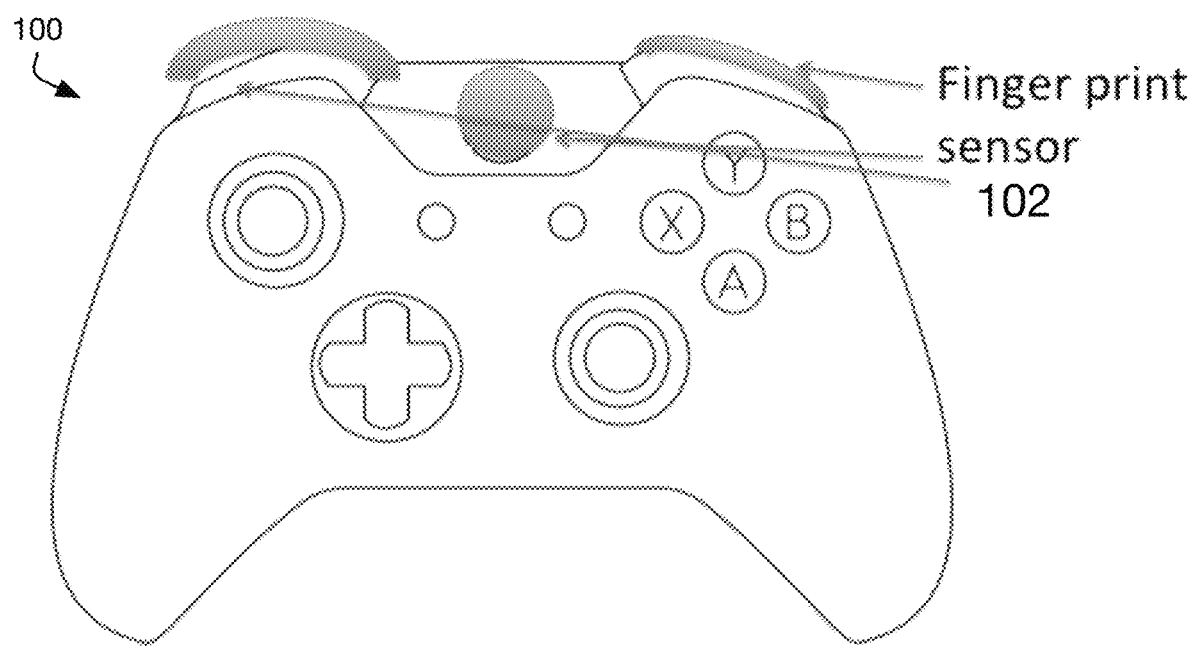
FIG. 1 is an example of a gaming controller with fingerprint sensors.

FIG. 1 shows an example of a gaming controller 100 with an integrated fingerprint sensor 102. Other devices may also be integrated with one or more fingerprint sensors, such as a remote control, a credit card, a keyless entry remote control, etc. Such devices with fingerprint sensors may be used with a variety of systems, such as gaming consoles, entertainment systems, payment systems, or other various systems that may require authentication and identification of a user to enable access to content, adjust user preferences or restrictions, etc.

In some embodiments, a thermal sensor may be used in conjunction with the fingerprint sensor to differentiate the presence of an actual finger from a mold or a fingerprint image of such a finger. For example, if a fingerprint sensor determines the presence of a valid fingerprint, such a fingerprint may nonetheless be rejected if the thermal sensor does not detect a heat signature within a specified range (e.g., 90 to 105 degrees Fahrenheit).

In some embodiments, a person may simply place his or her pointer finger on a fingerprint sensor in a remote controller to login to a console, access a game, or make a payment. In some embodiments, integrating a fingerprint sensor in an entertainment system controller may allow a parent or other administrator to set the level of access to content based on content ratings or time periods according to the sequence of fingerprints entered into the remote control. For example, if a channel is showing a PG-13 movie and a sequence of fingerprints entered on the remote control is associated with a user restricted to only PG content, the content of such a channel may not be displayed. As another example, if a game is rated as Mature and a sequence of fingerprints entered on the remote control is associated with a user that has no restrictions, the game may be played.

In some embodiments, the fingerprint sensor may be augmented by another thermal sensor to sense temperature so as to differentiate an actual finger from a reproduction of said finger. In other embodiments, the fingerprint sensor may have an integrated thermal sensor to generate a thermal pattern of the fingerprint and may use such a thermal pattern to determine if an actual finger or a reproduction of said finger is present. In other embodiments, a fingerprint sensor may generate a temperature measurement based on the method that said sensor uses for scanning the fingerprint.

In some embodiments, authentication or identification of a user may require a sequence of fingerprints be entered via one or more fingerprint sensors. Such a sequence of fingerprints may contain not only information sufficient to identify a fingerprint, but also may contain additional information specifying the appropriate orientation that a finger should be applied to a fingerprint sensor. In addition, the sequence of fingerprints may further require a specific order of fingerprints and orientations that must be presented to one or more fingerprint sensors and may further specify which fingerprint sensor should receive each fingerprint and orientation thereof.

As an example, with respect to FIG. 1, a sequence of fingerprints may require that a user press his or her index fingers almost simultaneously on the left and right fingerprint sensors, followed by pressing his or her right thumb on the center fingerprint sensor.

Figure 2:
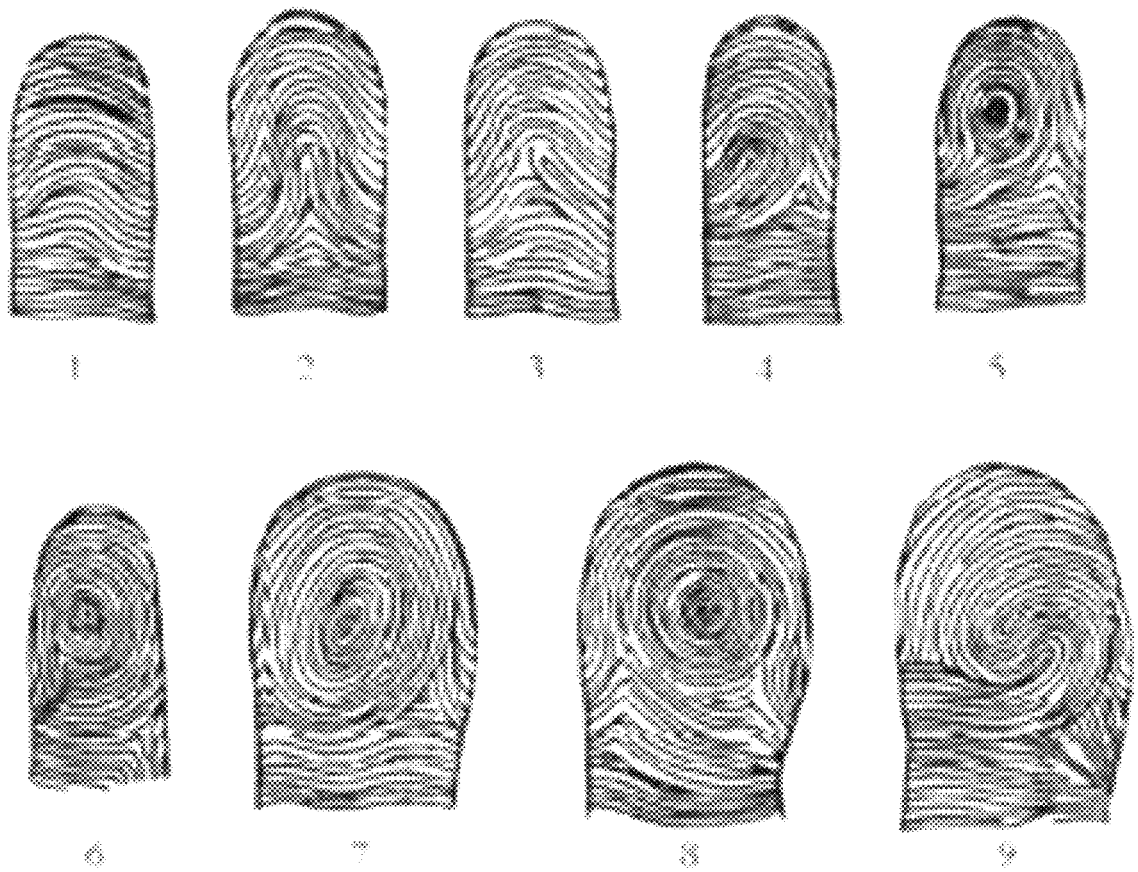
FIG. 2 is an example of a set of fingerprints.
Figure 3A:
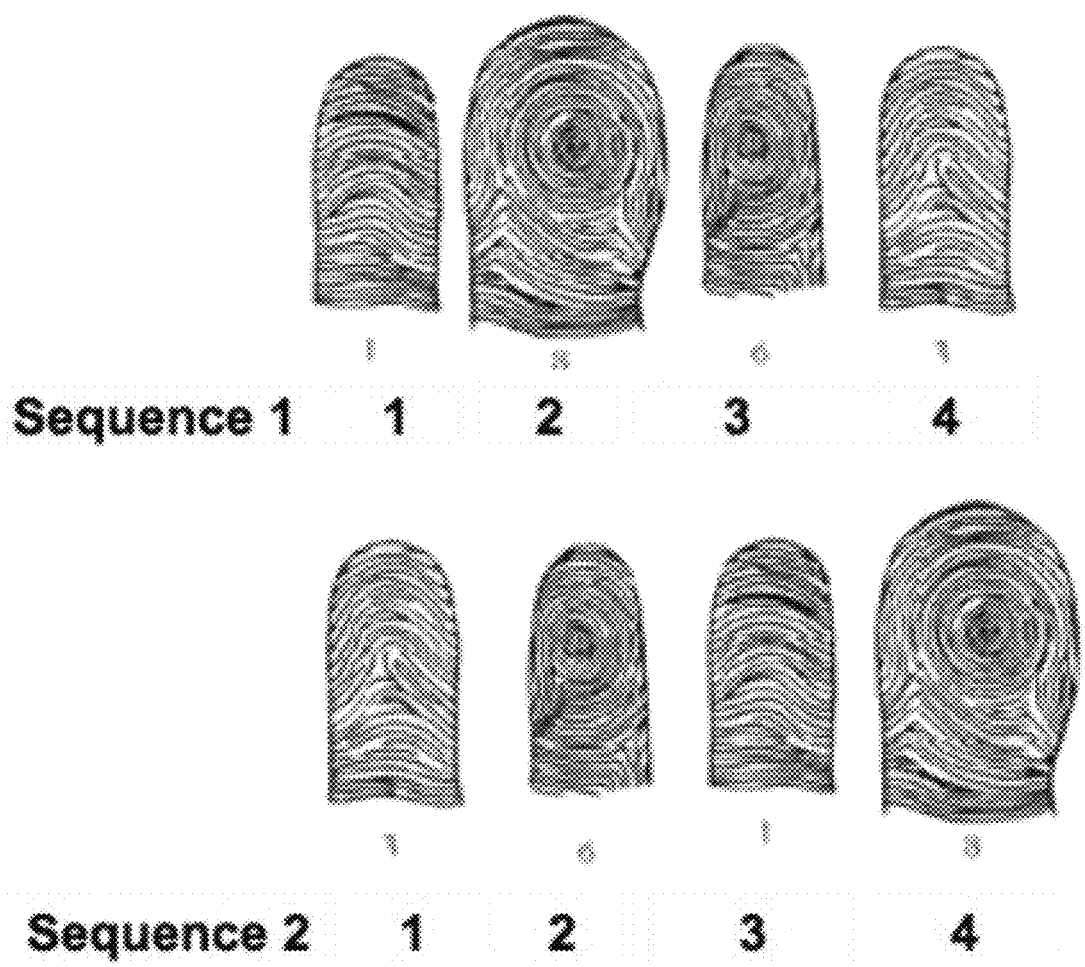
FIG. 3A is an example of sequences of fingerprints.

FIG. 2 shows a scan of nine fingers. In some embodiments, the user may create a sequence of fingerprints as shown in FIG. 3A. In some embodiments, the introduction of a sequence of fingerprints will introduce an additional level of security. Thus, to protect against scenarios where the fingerprint sensor has been spoofed or fingerprints have been stolen, the user will be able to generate a specific sequence or pattern to provide such additional security.

Figure 3B:
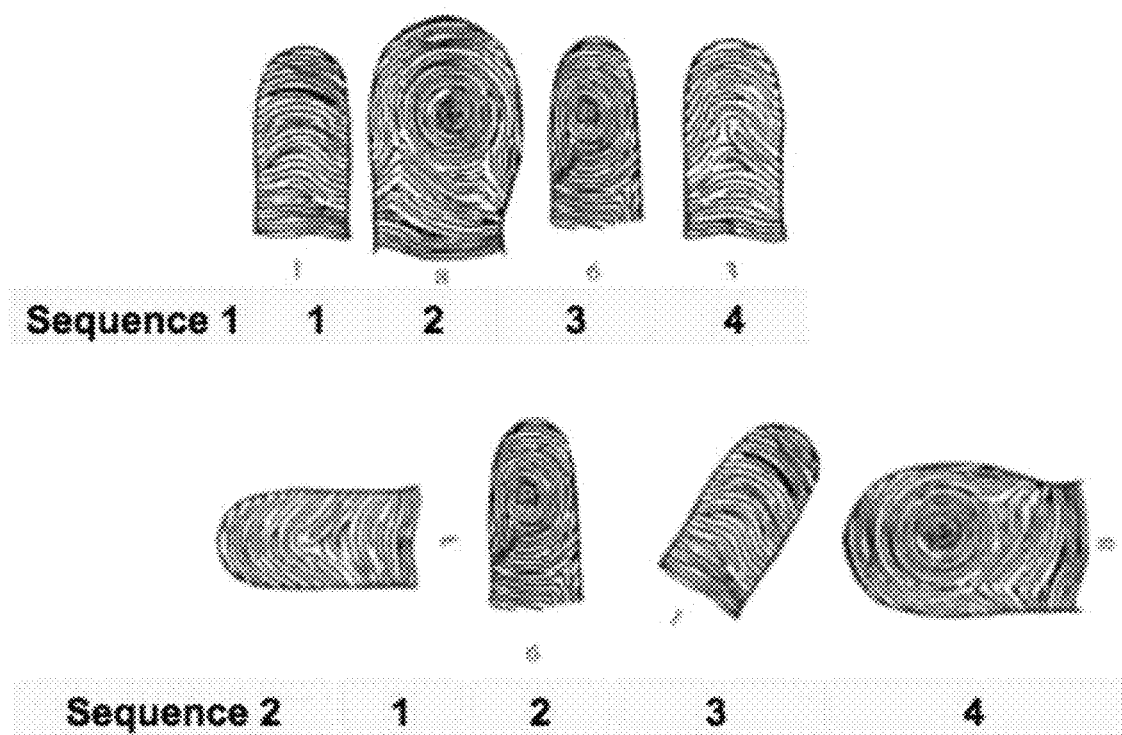
FIG. 3B is another example of sequences of fingerprints

FIG. 3B shows another example of two different sequences of a set of four fingerprints based on the set of nine fingerprints in FIG. 2. Such sequences of fingerprints may be used to form a biometric-based password. In some embodiments, a sequence of fingerprints may only be required only for certain actions. For example, requesting access to content may only require a single fingerprint be applied to a fingerprint setting, but requesting to change content restriction settings for a user may require a sequence of fingerprints. As shown in sequence 2 of FIG. 3B, the sequence of fingerprint data may also include orientation information for each fingerprint.

FIG. 4 shows a method 400 for using fingerprint orientation information as part of the sequence of fingerprints as part of the biometric-based password. At step 402, one or more fingerprint sensors on a device capture a sequence of fingerprints. In some embodiments, the number of fingers to scan may be selected. For example, a default choice may be ten fingers, which may then be down selected (e.g., four fingers). In further embodiments, the orientation of each finger to scan may be selected or displayed prior to scanning each finger. Alternatively, the orientation of each finger may be determined when scanned.

In some embodiments, the sequence or orientation of a set of fingerprints may be determined based on how data is received from the one or more fingerprint sensors. In other embodiments, the sequence or orientation of a set of fingerprints may be adjusted by the user after scanning of fingerprints has taken place. For example, if a system already has all the fingerprints of a user in storage, each fingerprint may be associated with a digit (e.g., right thumb, left index). A user may then specify a particular fingerprint sequence based on a sequence of digits of that user (e.g., right thumb, right pinky, right index) and may also modify the orientation of each digit in said sequence ((e.g., right thumb at 0 degrees, right pinky at 90 degrees, right index at 45 degrees). In some embodiments, the system may automatically adjust the orientation based on a device profile. For example, with respect to FIG. 1, the orientation of each fingerprint in the sequence may be adjusted so as to align it with how a user may hold a game controller. In various embodiments, the fingerprint sequence data may also include instructions that two or more fingerprints be presented approximately simultaneously on two or more fingerprint sensors, which may also specify the required orientation of each finger during such an action.

At step 404, an encryption key may be generated from the fingerprint sequence data. In some embodiments, the generation of the encryption key may also depend on other parameters, such as date, time, controller ID, etc. At step 406, the encryption key may be used to encrypt messages or data. At step 408, the encryption key may be associated with a set of instructions.

FIG. 5 shows a further method 500 for using fingerprint orientation information as part of the sequence of fingerprints as part of the biometric-based password. At step 502, one or more fingerprint sensors on a device capture a sequence of fingerprints. At step 504, the fingerprint sequence data may be compared to determine if it is valid. In some embodiments, a fingerprint sequence data may be compared with another fingerprint sequence stored in memory. Further, orientation and tolerances may be specified for each fingerprint, such that a statistical match of a certain level may be required before a fingerprint sequence may be considered valid. At step 506, if the fingerprint sequence data is valid, an encryption key may be retrieved. At step 508, the encryption key may be used to decrypt messages or data. At step 430, the encryption key may be used to perform a set of instructions.

For example, in some embodiments the fingerprint data sequence may be captured by a fingerprint sensor as shown in FIG. 1, which may then be digitized by a processor inside a controller. The controller may then transmit the digital data to a console for processing and authentication. After a correct sequence of fingerprints is entered into the console according to this method, the console may then allow the player to play, login, or make a payment. In some other embodiments, the fingerprint sensor may perform the digitization process of the fingerprint sequence/pattern. In addition, wireless transmission (e.g., Bluetooth, Wi-Fi, NFC, or other wireless standards) may be used to send digitized fingerprint data to a remote system to enable logging onto or accessing that system. On a gaming controller, for example, the fingerprint sensor may be located on triggers, buttons, touchpads, etc. and upon receiving the digitized fingerprint data the wireless controller may send such data to the gaming console.

In accordance with some embodiments, there may be a single or multiple fingerprint sensors to read the sequence/pattern entered by a user. The sensors may be part of a remote control, on a keyboard, on a debit/credit card, on a lock, or on a system that requires biometric security for access. The sensors may be wired or wirelessly connected to the system to allow the user to access or logon to the system.

In some embodiments, the sequence of the finger scans or the patterns of the scans may be a physical unclonable object and may be used to generate a Physical Unclonable Function (PUF). The PUF may then be used as an encryption key. The different sequences of the fingerprints and fingerprint patterns may create an infinite encryption key space. A PUF is a physical structure that has characteristics unique to the particular unit that cannot be duplicated even by the manufacturer of that object. Examples of PUFs include ring oscillators in a silicon chip where the frequency of the oscillators will vary due to the semiconductor manufacturing process tolerances resulting in transistors with different random characteristics which, when connected in a ring oscillator topology, will lead to random frequency variations specific to that chip coming out of the production line. Other examples of PUFs include S-RAM PUFs, coating PUFs, and Integrated Optical PUFs. Examples of encryption keys are RSA (Rivest, Shamir & Adleman), Diffie-Hellman, and ECC (Elliptic Curve Cryptography).

As described herein, the disclosed system may provide a secure way to log onto any game console or entertainment system using a fingerprint biometrics authentication sensor installed in a remote control or game controller of the console/entertainment system. By placing a fingerprint sensor on any kind of wireless or wired controller or access card, such a system may be used to generate a biometric passcode using a sequence of fingerprints or pattern of orientations of fingerprints or both. This biometric passcode may then be used to allow access to the system, such as a remote control, phone, computer, tablet, personal entertainment device, credit card or any system that may use fingerprint sensing for authentication/login. The biometric password may also allow for other functions to be performed by the system, such as making a payment via a remote control, credit card, game console, smart TV, etc. or replacing passwords on TVs, consoles, phones, computers (desktop and laptop), tablets, or any type of machine readable storage media that is comprised of a processor, a power source, memory, and connectivity, and that may have a display, a method of interaction such as a keyboard, touch, voice control, or eye tracking, and a single or plurality of fingerprint sensors.

When entering a fingerprint sequence or pattern, a specific combination that is different from the correct login sequence may be used to invoke an event (e.g., locking a device, sending notification of a failed attempt to another device).

After the correct fingerprint sequence or pattern is entered and the user is authenticated, the fingerprint sensor may be further used as an input device where specific sequences and patterns of fingerprints may trigger specific actions or events by the system or other connected systems.

The systems and methods disclosed herein may further ensure that a fingerprint is authentic by using heat and pulse sensing in the fingerprint sensor. In addition, the fingerprint sensor may also detect other biometrics, such as vein images, bone images, and heart rate, which may also be used to determine if a proper fingerprint is being presented to the sensor.

Figure 6:
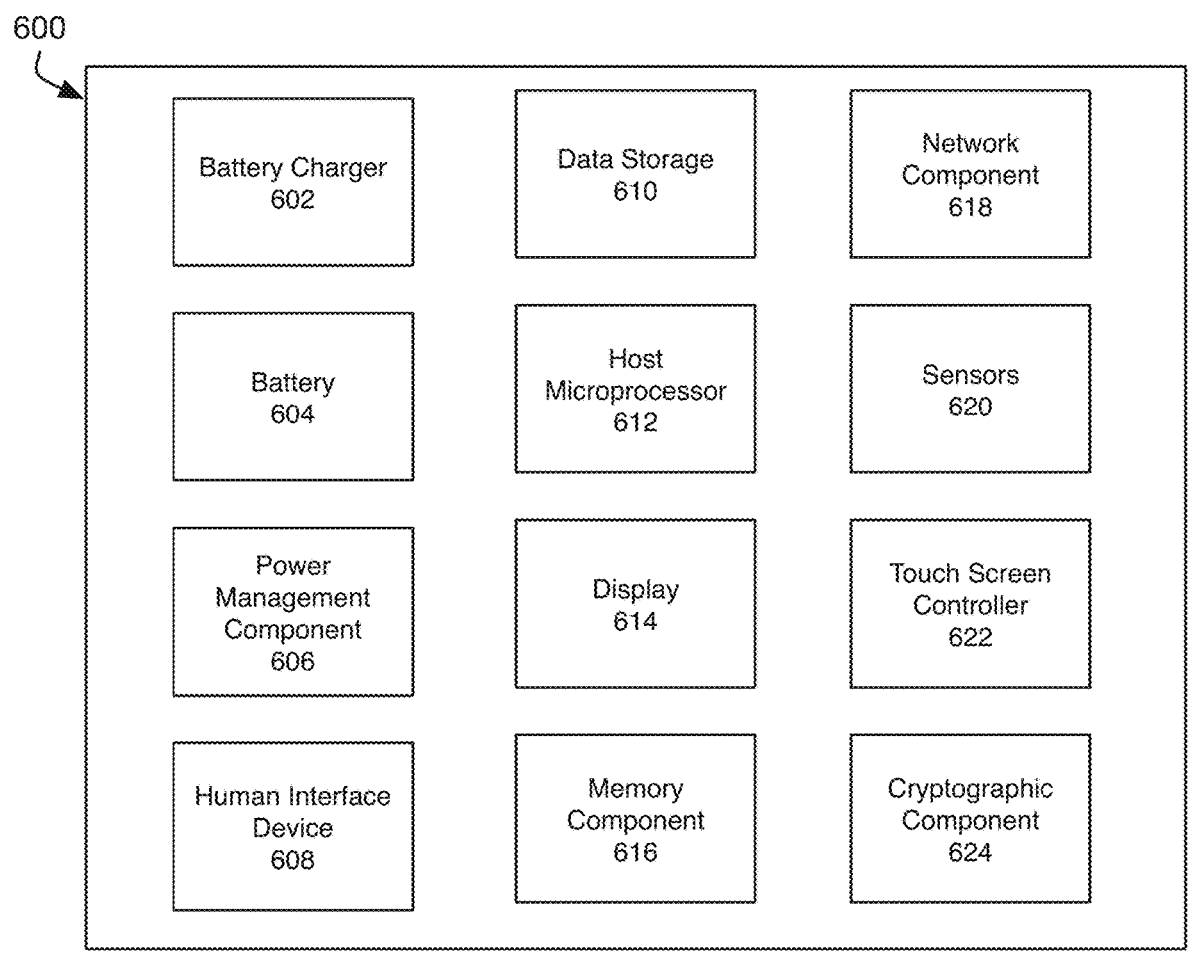
FIG. 6 is an example of a remote fingerprinting sensor system.

With respect to FIG. 6, a fingerprinting system 600 for implementing the methods described herein is shown. System 600 may include a battery charger 602, a battery 604, a power management component 606, a human interface device 608 (e.g., keyboard, trackpad, remote control), data storage 610, a host microprocessor 612, a display 614, a memory component 616, a network component 618 (e.g., Ethernet, ZigBee, Bluetooth), sensors 620 (e.g., fingerprint sensors, vein pattern sensors, bone pattern sensors, thermal sensors), touch screen controller 622, and cryptographic component 624. For example, cryptographic component 624 may contain cryptographic libraries (e.g., RSA, ECC) to support the methods described herein.

Figure 7:
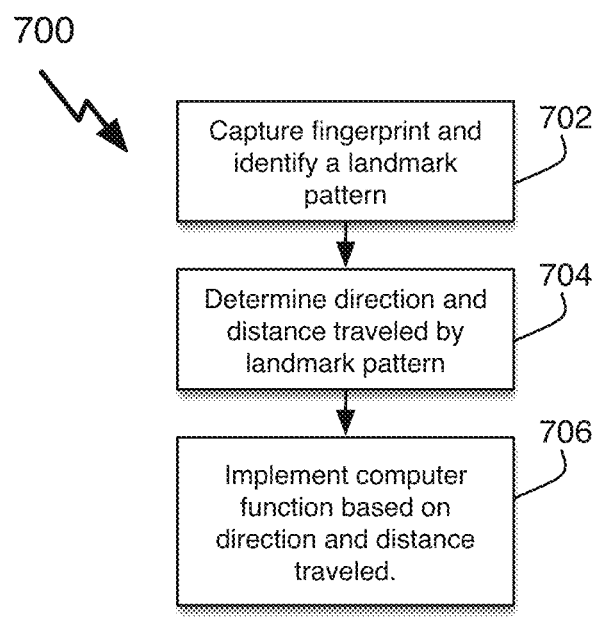
FIG. 7 is an example of a method for using fingerprint information to track movement of one or more fingers.
Figure 8:
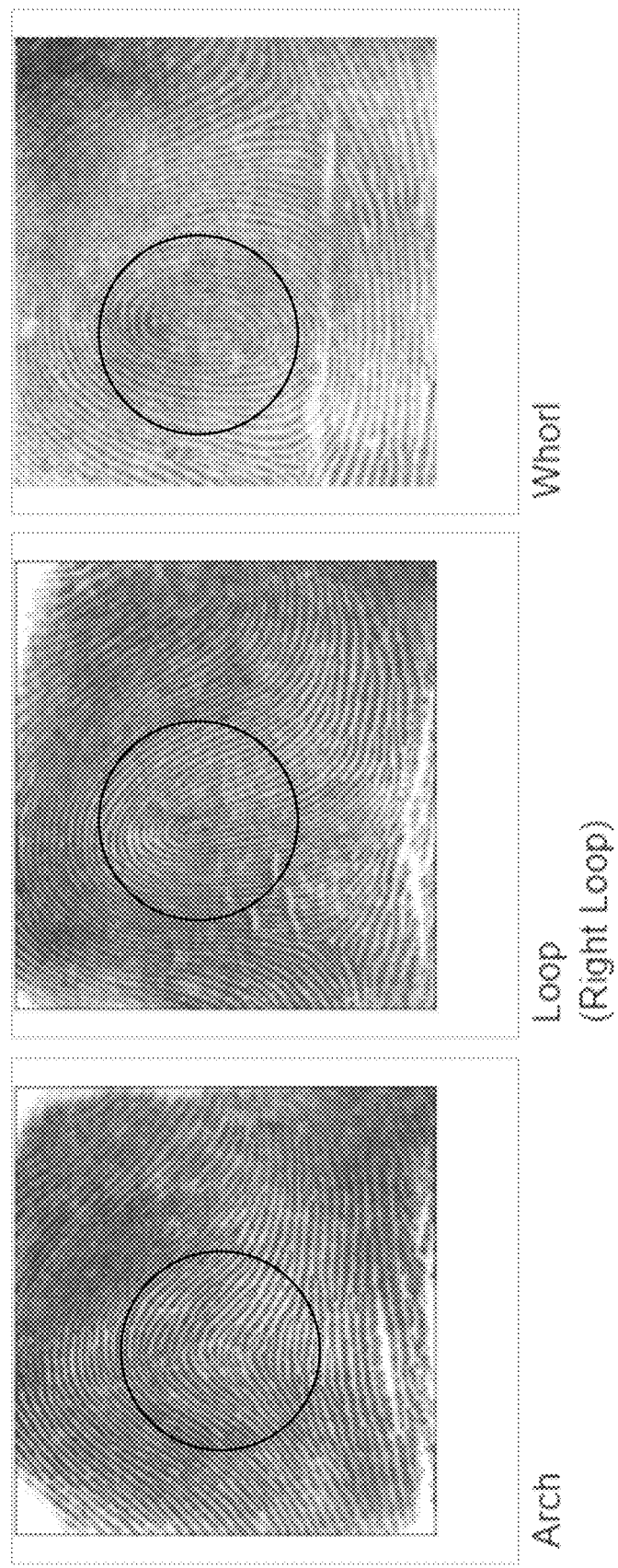
FIG. 8 is an example of landmark patterns in various fingerprints.

FIG. 7 shows a further method 700 for using fingerprint information to track movement of one or more fingers. At step 702, a fingerprint sensor may capture a fingerprint and identify a landmark pattern within the fingerprint for tracking movement. Examples of landmark patterns are shown in FIG. 8. At step 704, as a finger moves across a sensor, the direction and distance traveled by a landmark pattern may be determined. At step 706, the direction and distance traveled by one or more landmark patterns may be used to implement a computer function. For example, it may be used to enter a sequence of finger swipes to unlock a device or perform a log in function, to direct the movement of the cursor, to shrink or enlarge objects on a display, etc. A fingerprint swipe sequence data may be compared with another fingerprint swipe sequence stored in memory. Further, orientation and tolerances may be specified for each fingerprint swipe, such that a statistical match of a certain level may be required before a fingerprint swipe sequence may be considered valid. In some embodiments, if the fingerprint swipe sequence data and also the fingerprints are valid, an encryption key may be retrieved and the encryption key may be used to decrypt messages or data or used to perform a set of instructions.

Figure 9:
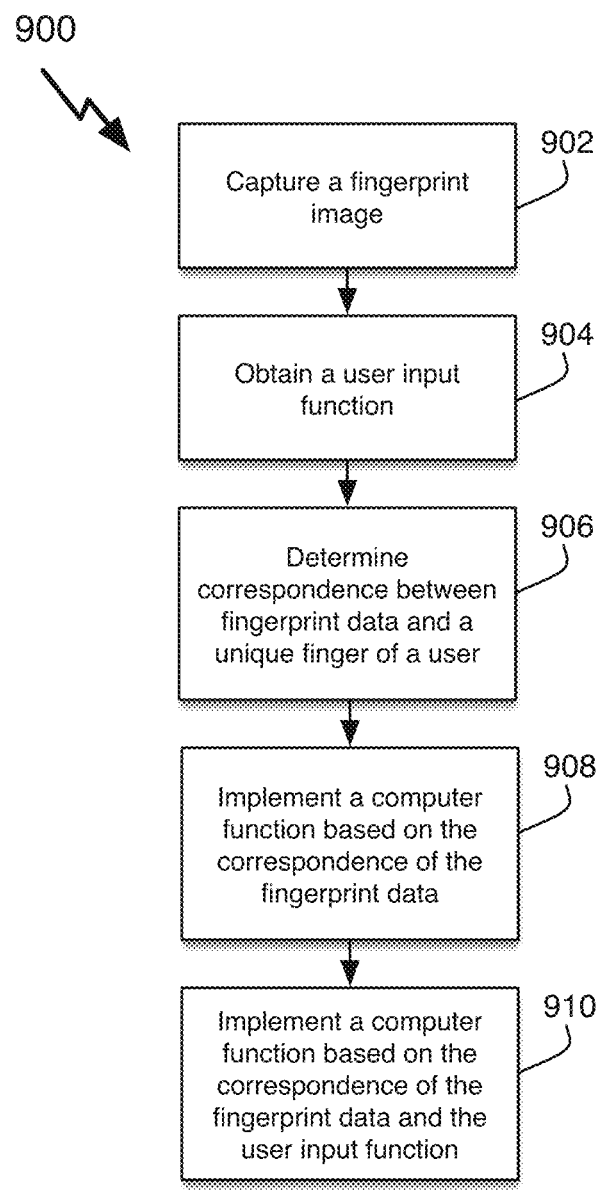
FIG. 9 is an example of a method for using fingerprint information to implement specific functions according to one or more individual fingers.

FIG. 9 shows a further method 900 for using fingerprint information to implement specific functions according to one or more individual fingers. At step 902, a fingerprint sensor may capture a fingerprint. At step 904, the fingerprint sensor or another sensor may detect a user input function such as the movement of a pointing stick, a tap or double-tap on a trackpad, a finger swipe sequence, the depression of a key or button, etc. At step 906, the fingerprint data may be compared with another fingerprint stored in memory to determine a correspondence between the fingerprint data and a finger of a user (e.g., thumb of right hand, index finger of left hand). Further, tolerances may be specified for each fingerprint, such that a statistical match of a certain level may be required before a fingerprint association with a unique finger of a user may be considered valid. At step 908, the fingerprint data may be used to implement a computer function based on the determination in step 906. For example, if the captured fingerprint is determined to be the index finger a device may be unlocked, while if the determination is that the captured fingerprint is determined to be the ring finger a panic or emergency message may be generated. At step 910, the fingerprint data may be used to implement a computer function based on the determination in step 906 and a user input function entered in step 904. For example, if the user input function is a tap and the fingerprint is associated with the index finger, the computer function may take the form of a left-mouse click. Alternatively, if the fingerprint is associated with the middle or ring finger, the computer function may take the form of a right-mouse click. In some embodiments, the above steps may be implemented depending on a combination of multiple fingerprint associations (e.g., a thumb and pointer finger combined with opposing movement between the two may result in a display zooming out on an object, while substituting the index finger for the pointer finger changes the result to an enlargement of the object on a virtual canvas).

Such embodiments may be particularly advantageous where fingerprint sensors are integrated with user input devices, such as a trackpad, touchscreen, keys, or buttons. However, in some embodiments such integration may not be implemented. For example, a keypad on a cash machine may have a sensor on which a user can rest a finger (e.g., the ring or pinky finger) while entering a PIN with the index finger. If the user enters a PIN with his or her ring finger on the sensor, the cash machine may determine based on the PIN and the ringer finger identification to access an individual checking account. Alternatively, in such an example if the pinky finger were used, the result may instead be that the cash machine may determine based on the PIN and the pinky finger identification to access a joint checking account. Further, the various methods described herein may be used in combination with each other. For example, with respect to the cash machine described above, the entry of a PIN may rely on each number being uniquely entered with a different fingerprint on the sensor, may require a swipe by different fingers, a unique sequence of fingerprint combinations for valid access to an account, or a combination thereof.

The disclosure and examples above are intended to be illustrative and are not intended to limit or otherwise restrict the invention. Numerous variations and modifications will become apparent to those skilled in the art upon full appreciation of the above disclosure, and the generic principles defined herein may be applied to other embodiments without departing from the spirit or scope of the disclosure.

For example, one skilled in the art will understand that the components and other features described herein can be implemented as discrete hardware components or integrated in the functionality of hardware components such as ASICS, FPGAs, DSPs or similar devices. In addition, one skilled in the art will understand that these components can be implemented as firmware or functional circuitry within hardware devices. Further, one skilled in the art will understand that these components can be implemented in any combination of hardware devices and software components.

Thus, the present disclosure is not intended to be limited to the embodiments shown herein but is to be accorded the widest scope consistent with the principles and novel features disclosed herein and with the scope and spirit of the appended claims.

All references cited herein are expressly incorporated by reference.

What is claimed is:

1. A system for enhancing fingerprint security comprising:
a set of two or more fingerprint sensors, wherein each fingerprint sensor is capable of generating fingerprint data and wherein each fingerprint sensor is a physically distinct component from any other fingerprint sensor;
a storage device containing fingerprint records; and
a processor configured to capture a sequence of fingerprints presented approximately simultaneously via the two or more fingerprint sensors, wherein the processor upon receiving the fingerprint data from each fingerprint sensor:
determines a fingerprint record that is associated with the fingerprint data;
determines a fingerprint angular orientation relative to the fingerprint record; and
determines an identifier based on the fingerprint record; and
wherein the processor upon receiving the fingerprint data from each fingerprint sensor is further configured to:
determine a landmark pattern based on the fingerprint record: and
determine a direction and distance travelled based on two or more positions of the landmark pattern on the fingerprint sensor.

2. The system of claim 1, wherein the processor is further configured to:
assign a timestamp to each fingerprint data; and
generate a fingerprint sequence based on a set of fingerprint data, wherein said sequence includes the timestamp, the fingerprint angular orientation, and the identifier associated with each fingerprint data.

3. The system of claim 2, wherein the identifier is further determined based on the fingerprint angular orientation.

4. The system of claim 3, further comprising:
a set of one or more thermal sensors, wherein each thermal sensor is capable of adding temperature data to one or more fingerprint data generated by the two or more fingerprint sensors.

5. The system of claim 4, wherein the processor is further configured to determine for each fingerprint record if the temperature data associated with said fingerprint record is within an acceptable range.

6. The system of claim 3, wherein the processor is further configured to:
compare the fingerprint sequence with a fingerprint sequence record; and if a valid comparison is determined perform a user-programmable instruction associated with said fingerprint sequence record.

7. A system for enhancing fingerprint security comprising:
a storage device containing fingerprint records; and
a processor configured to select a set of fingerprint records, generate a fingerprint sequence, and provide a user interface, wherein the user interface:
displays the set of fingerprint records to a user associated with the set of fingerprint records in an initial fingerprint sequence;
allows the user to rearrange an order or placement of the fingerprint records within the initial fingerprint sequence;
automatically assigns a fingerprint angular orientation associated with each fingerprint record based on the distribution of two or more fingerprint sensors across a handheld device, wherein each fingerprint sensor is a physically distinct component from any other fingerprint sensor;
allows the user to specify a user-programmable instruction that is associated with the fingerprint sequence; and
allows the user to instruct the processor to generate the fingerprint sequence based on the initial fingerprint sequence; and wherein the processor is further configured to:
determine a landmark pattern based on each fingerprint record: and
determine a direction and distance travelled based on two or more positions of the landmark pattern on one or more fingerprint sensors.

8. The system of claim 7, wherein the processor via the user interface is further configured to: assign an identifier based on each fingerprint record and the fingerprint angular orientation; and display the identifier to the user.

9. The system of claim 7, wherein the user-programmable instruction includes setting a level of access to content based on at least content rating or a period of time.

10. A computer-enabled method for enhancing fingerprint security comprising:
receiving a set of fingerprint data from a set of physically distinct fingerprint sensors, wherein the set of fingerprints was captured approximately simultaneously via the set of fingerprint sensors and wherein a first fingerprint interface of at least one fingerprint sensor is at an angle relative to a second fingerprint interface of at least one other fingerprint sensor;
determining for the set of fingerprint data a corresponding set of fingerprint records;
generating a set of fingerprint angular orientations by determining for each fingerprint data a fingerprint angular orientation based on the fingerprint record associated with each fingerprint data;
generating a fingerprint sequence based on the set of fingerprint data and the set of fingerprint angular orientations;
performing a comparison of the fingerprint sequence with a set of fingerprint sequence records; and when a valid comparison is found. performing a user-programmable instruct ion associated with the fingerprint sequence record that is a valid match to the fingerprint sequence;

determining a set of landmark patterns based on the set of finger records; and for each landmark pattern determining a direction and distance travelled based on two or more positions of the landmark pattern on one or more fingerprint sensors of the set of finger sensors.

11. The computer-enabled method of claim 10 further comprising:

receiving a set of temperature data from a set of thermal sensors associated with the set of fingerprint records;

determining if the set of temperature data is within an acceptable temperature range; and performing a pre-determined instruction if the set of temperature data is not within an acceptable temperature range.

* * * * *